(12) United States Patent
Govindan et al.

(10) Patent No.: US 8,496,234 B1
(45) Date of Patent: Jul. 30, 2013

(54) THERMODYNAMIC BALANCING OF COMBINED HEAT AND MASS EXCHANGE DEVICES

(75) Inventors: Prakash Narayan Govindan, Boston, MA (US); Gregory P. Thiel, Cambridge, MA (US); Ronan K. McGovern, Cambridge, MA (US); John H. Lienhard, Lexington, MA (US); Sarit K. Das, Cambridge, MA (US); Karim M. Chehayeb, Beirut (LB); Syed M. Zubair, Dhahran (SA); Mohammed A. Antar, Dhahran (SA)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/550,094

(22) Filed: Jul. 16, 2012

(51) Int. Cl.
*B01F 3/04* (2006.01)
(52) U.S. Cl.
USPC ............. 261/128; 261/96; 261/117; 261/152; 261/157; 261/159
(58) Field of Classification Search
USPC .................. 261/127, 128, 141, 152, 157, 159, 261/95, 96, 117
See application file for complete search history.

(56) References Cited

U.S. PATENT DOCUMENTS

| | | | | |
|---|---|---|---|---|
| 2,857,015 A | * | 10/1958 | Kelley et al. | 261/3 |
| 2,858,903 A | * | 11/1958 | Goetz et al. | 95/72 |
| 3,558,436 A | * | 1/1971 | Foley et al. | 202/196 |
| 3,831,667 A | * | 8/1974 | Kilgore et al. | 165/96 |
| 7,381,310 B2 | * | 6/2008 | Hernandez Hernandez et al. | 202/176 |
| 7,431,805 B2 | * | 10/2008 | Beckman | 203/2 |
| 8,252,092 B2 | * | 8/2012 | Govindan et al. | 95/211 |

(Continued)

FOREIGN PATENT DOCUMENTS

| | | |
|---|---|---|
| DE | 10215079 A1 | 10/2003 |
| EP | 1770068 A2 | 4/2007 |

OTHER PUBLICATIONS

M. Zamen, et al., "Improvement of solar humidification-dehumidification desalination process using multi-stage process", Proceedings of 14th International Conference on Process Integration, Modelling and Optimisation for Energy Saving and Pollution Reduction (2011).

(Continued)

*Primary Examiner* — Charles Bushey
(74) *Attorney, Agent, or Firm* — Modern Times Legal; Robert J. Sayre

(57) ABSTRACT

A carrier-gas mixture is directed through a fluid flow path in a combined heat and mass transfer device operating at a sub-atmospheric pressure. Heat and mass are transferred from or to the carrier-gas mixture via interaction with a liquid composition that includes a vaporizable component in a liquid state to substantially change the content of the vaporizable component in the carrier-gas mixture via evaporation or condensation of the vaporizable component. The mass flow rate of the carrier-gas mixture is varied by extracting or injecting the carrier-gas mixture from at least one intermediate location in the fluid flow path, and/or the mass flow rate of the liquid composition is varied by extracting or injecting the liquid composition from at least one intermediate location in the fluid flow path; and the flow of the carrier-gas mixture or the liquid composition is regulated to reduce the average local enthalpy pinch in the device.

17 Claims, 8 Drawing Sheets

U.S. PATENT DOCUMENTS

| | | | |
|---|---|---|---|
| 8,292,272 B2 * | 10/2012 | Elsharqawy et al. | 261/117 |
| 2002/0166758 A1 * | 11/2002 | Vinz | 203/2 |
| 2011/0056822 A1 | 3/2011 | Elsharqawy et al. | |
| 2011/0079504 A1 | 4/2011 | Govindan et al. | |
| 2013/0015051 A1 * | 1/2013 | Elsharqawy et al. | 203/11 |

OTHER PUBLICATIONS

M.A. Younis, et al., "Experimental and theoretical study of humidification-dehumidification desalting system", 94 Desalination 11-24 (1993).

K. Bourouni, et al., "Water desalination by humidification and dehumidification of air: state of the art", 137 Desalination 167-176 (2001).

S. Hou, "Two-stage solar multi-effect humidification dehumidification desalination process plotted from pinch analysis", 222 Desalination 572-78 (2008).

M. Zamen, et al., "Improvement of solar humidification-dehumidification desalination process using multi-stage process", 25 Chemical Engineering Transactions 1091-96 (2011).

* cited by examiner (a) Temperature profile (b) Humidity ratio profile

Dehumidifier balanced

THERMODYNAMIC BALANCING OF COMBINED HEAT AND MASS EXCHANGE DEVICES

BACKGROUND

In this century, the shortage of fresh water will surpass the shortage of energy as a global concern for humanity, and these two challenges are inexorably linked, as explained in the "Special Report on Water" in the 20 May 2010 issue of The Economist. Fresh water is one of the most fundamental needs of humans and other organisms; each human needs to consume a minimum of about two liters per day. The world also faces greater freshwater demands from farming and industrial processes.

The hazards posed by insufficient water supplies are particularly acute. A shortage of fresh water may lead to a variety of crises, including famine, disease, death, forced mass migration, cross-region conflict/war, and collapsed ecosystems. Despite the criticality of the need for fresh water and the profound consequences of shortages, supplies of fresh water are particularly constrained. 97.5% of the water on Earth is salty, and about 70% of the remainder is locked up as ice (mostly in ice caps and glaciers), leaving only a fraction of all water on Earth as available fresh (non-saline) water.

Moreover, the earth's water that is fresh and available is not evenly distributed. For example, heavily populated countries, such as India and China, have many regions that are subject to scarce supplies. Further still, the supply of fresh water is often seasonally inconsistent. Meanwhile, demands for fresh water are tightening across the globe. Reservoirs are drying up; aquifers are falling; rivers are dying; and glaciers and ice caps are retracting. Rising populations increase demand, as do shifts in farming and increased industrialization. Climate change poses even more threats in many regions. Consequently, the number of people facing water shortages is increasing. Naturally occurring fresh water, however, is typically confined to regional drainage basins; and transport of water is expensive and energy-intensive.

On the other hand, many of the existing processes for producing fresh water from seawater (or to a lesser degree, from brackish water) require massive amounts of energy. Reverse osmosis (RO) is currently the leading desalination technology. In large-scale plants, the specific electricity required can be as low as 4 kWh/m$^3$ at 30% recovery, compared to the theoretical minimum of around 1 kWh/m$^3$; smaller-scale RO systems (e.g., aboard ships) are less efficient.

Other existing seawater desalination systems include thermal-energy-based multi-stage flash (MSF) distillation, and multi-effect distillation (MED), both of which are energy- and capital-intensive processes. In MSF and MED systems, however, the maximum brine temperature and the maximum temperature of the heat input are limited in order to avoid calcium sulphate precipitation, which leads to the formation of hard scale on the heat transfer equipment.

Humidification-dehumidification (HDH) desalination systems include a humidifier and a dehumidifier as their main components and use a carrier gas (e.g., air) to communicate energy between the heat source and the brine. A simple version of this technology includes a humidifier, a dehumidifier, and a heater to heat the seawater stream. In the humidifier, hot seawater comes in direct contact with dry air, and this air becomes heated and humidified. In the dehumidifier, the heated and humidified air is brought into (indirect) contact with cold seawater and gets dehumidified, producing pure water and dehumidified air. Some of the present inventors were also named as inventors on the following patent applications that include additional discussion of HDH and other processes for purifying water: U.S. application Ser. No. 12/554,726, filed 4 Sep. 2009 (published as US 2011/0056822 A1; U.S. application Ser. No. 12/573,221, filed 5 Oct. 2009 (published as US 20110079504 A1); U.S. application Ser. No. 13/028,170, filed 15 Feb. 2011; and U.S. application Ser. No. 13/241,907, filed 23 Sep. 2011; U.S. Application Ser. No. 61/595,732, filed 7 Feb. 2012.

SUMMARY

Methods and apparatus for thermodynamic balancing are described herein. Various embodiments of the methods and apparatus may include some or all of the elements, features and steps described below.

Thermodynamic irreversibilities in a combined heat and mass transfer device are reduced by manipulating the stream-to-stream mass flow rate ratio of the fluid streams exchanging heat and mass along the fluid flow path. The streams exchanging heat and mass in the aforementioned device can be a carrier gas mixture containing a condensable component in a vapor state and a liquid composition that includes a vaporizable component in a liquid state. Heat and mass are transferred from or to the carrier-gas mixture by a direct or indirect interaction with a liquid composition to substantially change the content of the vaporizable component in the carrier-gas mixture via evaporation of the vaporizable component from the liquid composition or via condensation of the vaporizable component from the carrier-gas mixture, thereby producing a flow of carrier-gas mixture having a concentration of the vaporizable component that differs from the concentration of the vaporizable component in the carrier-gas mixture before the heat and mass transfer process. The mass flow rate of the carrier-gas mixture is varied by extracting or injecting the carrier-gas mixture from at least one intermediate location in the fluid flow path in the combined heat and mass transfer device, and/or the mass flow rate of the liquid composition is varied by extracting or injecting the liquid composition from at least one intermediate location in the fluid flow path in the heat and mass transfer device; and the flow of the carrier-gas mixture or the liquid composition is regulated in the combined heat and mass transfer device to reduce the minimum local enthalpy pinch in the device.

In particular embodiments, thermodynamic irreversibilities are reduced in a humidification-dehumidification (HDH) system by manipulating the stream-to-stream mass flow rate ratio along the fluid flow path the humidifier and the dehumidifier. In the humidifier, heat and mass are transferred to the carrier-gas mixture by a direct interaction with a liquid composition comprising the vaporizable component in a liquid state as one of its components to substantially increase the content of the vaporizable component in the carrier-gas mixture via evaporation of vaporizable component from the liquid composition. The carrier-gas mixture is then directed from the humidifier to a dehumidifier where heat and mass are transferred from the carrier-gas mixture by an indirect interaction with the liquid composition, reducing the content of the vaporizable component in the carrier-gas mixture and preheating the liquid composition. The mass flow rate of the carrier-gas mixture is varied by extracting the carrier-gas mixture from at least one intermediate location in the fluid-flow path in the humidifier and injecting the extracted carrier-gas mixture at a corresponding location in the dehumidifier, and/or the mass flow rate of the liquid composition is varied by extracting the liquid composition from at least one intermediate location in the fluid-flow path in the humidifier and injecting the liquid composition at a corresponding location in the dehumidifier; and the flow of the carrier-gas mixture or of the liquid composition between the intermediate locations of the fluid flow paths in the humidifier and the dehumidifier is regulated to reduce the average local enthalpy pinch in the dehumidifier.

In accordance with these methods, a novel "enthalpy pinch" is defined herein for combined heat and mass exchange devices. Enthalpy pinch ($\psi$) combines stream-to-stream temperature and humidity ratio differences and is directly related to the effectiveness of the device. This concept of enthalpy pinch can be used in thermodynamic analyses of systems containing HME devices. Closed-form equations for the temperature and humidity ratio profiles of a completely and continuously balanced heat and mass exchange (HME) device with zero "remanent" irreversibility are also introduced herein. This state of complete thermodynamic balancing (in humidifiers and in dehumidifiers) is found to be closer to a state of constant local humidity ratio difference than to that of a constant stream-to-stream temperature difference.

By continuous injection of mass in a dehumidifier, the entropy generation in the device can be brought down to ¼th of that in a device without injections. By a single injection, it can be brought down to ⅗th. In these cases, either the liquid composition or the carrier gas mixture may be injected into the dehumidifier.

These observations are used herein for the design of thermodynamically balanced HDH systems via the algorithms presented herein both for systems with continuous and with discrete extractions and injections. Performance of an HDH system with a completely balanced humidifier and that of an HDH system with a completely balanced dehumidifier are found to be similar.

Thermodynamic balancing is found to be particularly effective when the HME devices have an appropriately low enthalpy pinch ($\psi \leq 27$ kJ/kg dry air). At very low values of the enthalpy pinch ($\psi \leq 7$ kJ/kg dry air) in the humidifier and the dehumidifier, continuous balancing with an infinite number of extractions and injections is found to provide results that are much better than results obtained with a single extraction and injection. At higher values of enthalpy pinch ($7 < \psi \leq 15$ kJ/kg dry air), a single extraction and injection reduced the entropy generation of the total system by a similar amount as infinite extractions and injections. At even higher values of enthalpy pinch ($15 < \psi \leq 27$ kJ/kg dry air), single extraction/injection outperformed infinite extractions/injections and at $\psi > 27$ kJ/kg dry air, thermodynamic balancing has no significant effect on the performance of the HDH system.

The methods and apparatus can be used for the desalination of seawater and other forms of water purification and extraction. Additionally, the methods and apparatus can be applied to improve the performance of combined heat and mass exchange devices, such as gas scrubbers, bubble column reactors, and cooling towers.

The methods and apparatus can also offer the advantages of higher energy efficiency, even when using low grades of energy (instead of high-temperature steam or electricity), and lower energy costs and, hence, lower cost of water production. By thermodynamically balancing the humidifier or the dehumidifier through mass extraction and injection, energy consumption can be reduced, and entropy generation caused by imbalance in driving temperature and concentration differences can be minimized within the constraints of the system (e.g., within size or cost limits). Moreover, the methods can provide near-complete thermodynamic reversibility in an HDH system with a 100% effective humidifier and dehumidifier.

Figure 1:
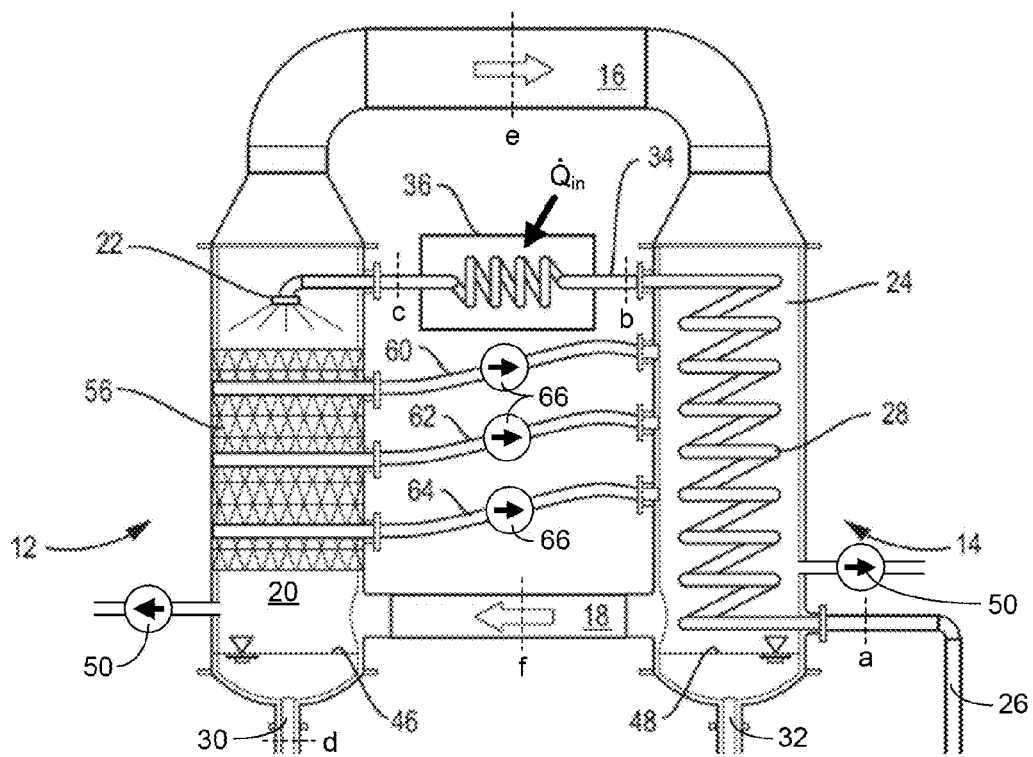
FIG. 1 is a schematic diagram of a water-heated, closed-air, open-water humidification-dehumidification desalination system with mass extraction and injection of the moist air stream.

In the accompanying drawings, like reference characters refer to the same or similar parts throughout the different views; and apostrophes are used to differentiate multiple instances of the same or similar items sharing the same reference numeral. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%, wherein percentages or concentrations expressed herein can be either by weight or by volume) can be understood as being within the scope of the description; likewise, if a particular shape is referenced, the shape is intended to include imperfect variations from ideal shapes, e.g., due to manufacturing tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Nomenclature:
Acronyms:
GOR=Gained Output Ratio
HDH=Humidification Dehumidification
HE=Heat Exchanger
HME=Heat and Mass Exchanger
TTD=Terminal Temperature Difference
Symbols:
$c_p$=specific heat capacity at constant pressure (J/kg·K)
$\dot{H}$=total enthalpy rate (W)
g=specific Gibbs energy (J/kg)
h=specific enthalpy (J/kg)
h*=specific enthalpy (J/kg dry air)
$h_{fg}$=specific enthalpy of vaporization (J/kg)
HCR=control volume based modified heat capacity rate ratio for HME devices
$m_r$=water-to-air mass flow rate ratio
$\dot{m}$=mass flow rate (kg/s)
N=number of extractions/injections
P=absolute pressure (Pa)
$\dot{Q}$=heat transfer rate (W)
RR=recovery ratio (%)
s=specific entropy (J/kg·K)
sal=feed water salinity (g/kg)
$\dot{S}_{gen}$=entropy generation rate (W/K)
T=temperature (° C.)
Greek:
$\Delta$=difference or change
$\epsilon$=energy based effectiveness
$\psi$=enthalpy pinch (kJ/kg dry air)
$\psi_{TD}$=terminal enthalpy pinch (kJ/kg dry air)
$\eta_{tvc}$=reversible entrainment efficiency for a TVC
$\eta_e$=isentropic efficiency for an expander
$\phi$=relative humidity
$\omega$=absolute humidity (kg water vapor per kg dry air)
Subscripts:
a=humid air
c=cold stream
deh=dehumidifier
da=dry air
h=hot stream
hum=humidifier
HE=heat exchanger
in=entering
int=water-vapor interface
max=maximum
local=defined locally
out=leaving
pw=pure water
rev=reversible
w=seawater
Thermodynamic States:
a=seawater entering the dehumidifier
b=preheated seawater leaving the dehumidifier
c=seawater entering the humidifier from the brine heater d=brine reject leaving the humidifier
e=moist air entering the dehumidifier
ex=moist air state at which mass extraction and injection is carried out in single-extraction cases
f=relatively dry air entering the humidifier
g=air at an arbitrary intermediate location in the dehumidifier
i=seawater at an arbitrary intermediate location in the dehumidifier Methods and apparatus described herein can be used to separate substantially pure water from a liquid composition (including—but not limited to—seawater, brackish water and waste water) in an energy-efficient manner. This approach can be used in the technology known as humidification-dehumidification desalination (HDH). Members of the present team of inventors have filed previous patent applications describing improvements to HDH technology, including those which have been published as US 2011/0056822 A1, "Water Separation Under Reduced Pressure", and US 2011/0079504 A1, "Water Separation Under Varied Pressure". Various apparatus and methods described in those patent applications can be used in combination with the apparatus and methods described herein to, for example, further improve the energy efficiency of HDH systems.

The methods described herein can balance the driving thermodynamic potential (i.e., local temperature and/or concentration differences) along the fluid-flow path of a humidifier and/or dehumidifier to reduce the entropy generated in HDH systems. This balancing can, in turn, increase the heat recovered from the dehumidifier to the humidifier and can reduce the energy consumed per unit amount of water desalinated. The design draws upon the fundamental observation that there is a single value of the water-to-air mass flow rate ratio (for any given boundary conditions and component effectiveness or fixed hardware configuration) at which the system performs optimally.

Description of Apparatus:

An illustration of an embodiment of the HDH system with mass extractions and injections is shown in FIG. 1. In a humidification-dehumidification cycle that utilizes liquid-composition heating, as is shown in FIG. 1, a carrying gas (such as air) is circulated through gas conduits 16 and 18 between a humidifier 12 and a dehumidifier 14 in, e.g., a closed loop system. The humidifier 12 and dehumidifier 14 are of a modular construction (i.e., separate parts) and are substantially thermally separated from one another. The characterization of the humidifier and dehumidifier as being "substantially thermally separated" is to be understood as being structured for little or no direct conductive heat transfer through the apparatus between the humidification and dehumidification chambers, though this characterization does not preclude the transfer of thermal energy via gas and/or liquid flow between the chambers. This "substantial thermal separation" characterization thereby distinguishes the apparatus from, e.g., a dewvaporation apparatus, which includes a shared heat-transfer wall between the humidifier and the dehumidifier. In the apparatus of this disclosure, the humidifier 12 and dehumidifier 14 do not share any common walls that would facilitate conductive heat transfer therebetween.

Instead, thermal energy is transferred between the chambers mostly via mass flow of the gas and liquid. The gas is humidified in the humidification chamber 20 of the humidifier 12 using the hot impure water (i.e., the liquid composition—for example, in the form of an aqueous saline solution), which is sprayed from one or more nozzles 22 at the top of the humidifier 12 while the gas moves in a counter-flow direction (up through the humidification chamber 20, as shown), thereby substantially increasing the water vapor content in the gas (e.g., increasing the water vapor content by at least 50%) via evaporation of water (e.g., about 5 to 10% of the water) from the liquid composition into the carrier gas flow. The remaining portion of the liquid composition (that which is not evaporated in the humidification chamber 20) pools at the bottom of the chamber 20 and drains through a liquid-mixture output conduit 30.

Sub-atmospheric pressure can be established by coupling a vacuum pump 50 both to the humidification chamber 20 and to the dehumidification chamber 24. Alternatively, a static head can be established by coupling a liquid-mixture tank to conduit 30 and a pure-water tank to conduit 32 with both tanks positioned below the chambers 20 and 24 to establish the pressure head via gravity acting on the liquids; this configuration is further described and illustrated in Published US Patent Application No. 2011/0056822 A1. The sub-ambient-atmospheric pressure in both the humidification chamber 20 and dehumidification chamber 24 can be substantially the same and can be, for example, at least 10% less than ambient atmospheric pressure, e.g., 90 kPa or less; or, in particular embodiments, 70 kPa or less; or, in more-particular embodiments, between 10 and 60 kPa.

The humidification chamber 20 can be filled with a packing material 56 in the form, e.g., of polyvinyl chloride (PVC) packing to facilitate turbulent gas flow and enhanced direct contact between the carrier gas and the liquid mixture. The body of the humidifier (and the dehumidifier) can be formed, e.g., of stainless steel and is substantially vapor impermeable; seals formed, e.g., of epoxy sealant, gaskets, O-rings, welding or similar techniques, are provided at the vapor and water inputs and outputs of the humidifier and at the interfaces of each modular component and adjoining conduits to maintain vacuum in the system. In one embodiment, humidification chamber 20 is substantially cylindrical with a height of about 1.5 m and a radius of about 0.25 m.

Humidification of the carrier gas is achieved by spraying the liquid mixture from one or more nozzles 22 into a spray zone at the top of the humidifier 12 then through a packing material 56 and down through a rain zone to a surface 46 of collected liquid mixture at the bottom of the chamber, while the carrier gas moves up through the humidification chamber 20, as shown, and is brought into contact with the liquid mixture, particularly in the bed of packing material 56, to add water vapor from the liquid mixture to the carrier gas.

The humidified carrier gas is then directed from the humidifier 12 through a conduit 16 to the dehumidifier 14, where the carrier gas is dehumidified in a dehumidification chamber 24 using the cold liquid composition pumped via pump 54 through a liquid-mixture input conduit 26 and through a coiled conduit 28 inside the dehumidification chamber 24, allowing for heat transfer from the gas to the liquid composition inside the dehumidifier 14. The water vapor in the gas therefore condenses on the coiled conduit 28 and is collected as substantially pure water in a pool of water 48 at the bottom of the dehumidification chamber 24. The collected pure water can then be removed from the dehumidifier 14 through a pure-water output conduit 32 for use, e.g., as drinking water, for watering crops, for washing/cleaning, for cooking, etc. The carrier gas can be circulated between the humidifier and dehumidifier via the terminal conduits 16 and 18 naturally or by using a fan. If a fan is used for gas circulation, the fan may be powered by a photovoltaic solar panel or by a wind turbine, and the fan may be put in the top gas conduit 16 or in the bottom gas conduit 18.

After being preliminarily heated in the dehumidifier 14, the liquid composition is passed via a liquid-composition conduit 34 to the humidifier 12. A heater 36 can be included in or along the conduit 34 to further heat the liquid composition before entering the humidifier 12. The heater 36 may use a solar energy source (e.g., the heater may be in the form of a solar collector) and/or may use any waste heat source (e.g., use waste heat generated by other nearby machinery or by a power generating apparatus) to heat the liquid composition. In particular embodiments, heating of the liquid composition is limited to prevent scaling in the apparatus as a consequence of exceeding the precipitation temperature of scaling components (e.g., calcium sulphate, magnesium sulphate, calcium carbonate and/or bicarbonate) in the liquid composition.

In this process, the pressure inside both the humidifier 12 and the dehumidifier 14 is reduced below the atmospheric pressure (i.e., the ambient pressure in the atmosphere surrounding the humidifier and dehumidifier—e.g., lower than about 101 kPa at sea level), in contrast with previous humidification-dehumidification desalination processes that operate at ambient atmospheric pressure. As the pressure inside the humidifier 12 decreases, the ability of the humidified gas to carry more water vapor increases, thereby providing increased production of the pure water when the gas is dehumidified in the dehumidifier 14. This increased capacity for water-vapor transport can be explained by the humidity ratio (i.e., the ratio of water vapor mass to dry air mass in moist air), as the ratio is higher at pressures lower than atmospheric pressure. For example, with air (as a carrier gas) at a dry bulb temperature of 60° C., the saturation humidity ratio at 50 kPa is roughly 150% higher than at atmospheric pressure.

A multi-extraction configuration, wherein the gas is extracted from a plurality of distinct intermediate locations in the humidifier 12 and fed to corresponding distinct intermediate locations in the dehumidifier 14, is provided via gas conduits 60, 62 and 64, allowing for manipulation of gas mass flows, thermal balancing of equipment and for a higher recovery of heat. The "corresponding" locations represent locations in the respective chambers at which the temperature and vapor concentration of the extracted stream of fluid and the temperature and vapor concentration of the stream of fluid into which the extracted stream is injected are similar (e.g., within 1° C. and 1%) if not equal. Such "corresponding" locations are used to avoid losses that are characterized as the irreversiblity of mixing. When two streams that have dissimilar equilibrium states are mixed, a highly irreversible process may be needed to bring these streams to thermal equilibrium, causing large thermodynamic losses.

The gas flow can be driven through the conduits 60, 62 and 64 by variable-frequency-control fans 66 in the of the conduits 60, 62, 64. The rate at which the gas should be extracted through each conduit 60/62/64 depends strongly on the operating conditions, and the rate can be controlled by adjusting the speed of variable-speed fans 66 by varying the voltage supplied from a voltage source to the fans 66 or by adjusting the pressure drop in the extraction conduits 60, 62, 64 (e.g., by using an adjustable valve in the conduit and by controlling the valve to expand or constrict the diameter of the passage through the conduit). In particular embodiments, the flow rate of the carrier-gas mixture (or the liquid composition) can be dynamically varied (increased or decreased) during the process.

The above-described system of FIG. 1 is a water-heated, closed-air, open-water system with three air extractions from the humidifier 12 into the dehumidifier 14. States a to d in conduits 26, 34 and 30 are used to represent various states of the liquid stream, and states e and f in conduits 16 and 18 represent those of moist air before and after dehumidification. There are several other embodiments of the system based on the various classifications of HDH listed by G. P. Narayan, et al., "The Potential of solar-driven humidification-dehumidification desalination for small-scale decentralized water production," *Renewable and Sustainable Energy Reviews*, Vol. 14, pp. 1187-1201 (2010).

Thermal Balancing in Combined Heat and Mass Transfer Devices:

"Control Volume" Balancing:

To understand thermodynamic balancing in HME devices, consider the simpler case of a heat exchanger first. In the limit of infinite heat transfer area, the entropy generation rate in this device is due to what is known as thermal imbalance or remanent irreversibility, which is associated with conditions at which the heat capacity rate of the streams exchanging heat are not equal. In other words, a heat exchanger (with constant heat capacity for the fluid streams) is said to be thermally "balanced" (with zero remanent irreversibility) at a heat capacity rate ratio of one. This concept of thermodynamic balancing, well known for heat exchangers, was recently extended to HME devices.

In order to define a thermally "balanced" state in HME devices, a modified heat capacity rate ratio for combined heat and mass exchange was defined by analogy to heat exchangers as the ratio of the maximum change in total enthalpy rate of the cold stream to that of the hot stream. The maximum changes are defined by defining the ideal states that either stream can reach at the outlet of the device. For example, the ideal state that a cold stream can reach at the outlet will be at the inlet temperature of the hot stream; and the ideal state that a hot stream can reach at the outlet will be at the inlet temperature of the cold stream.

$$HCR = \left(\frac{\Delta \dot{H}_{max,c}}{\Delta \dot{H}_{max,h}}\right) \quad (1)$$

At fixed inlet conditions and effectiveness, as shown above, the entropy generation of a combined heat and mass exchange device is minimized when the modified heat capacity rate ratio (HCR) is equal to unity. Further, for a fixed heat transfer rate, condensation rate, and HME size, the entropy generation in a dehumidifier approaches a minimum when the HCR approaches unity. Thus, we could say that the HCR being unity defines the balanced state for HME devices irrespective of whether it is a fixed effectiveness or a fixed hardware condition. This, however, is a "control volume" balanced state wherein the design does not include mass extractions and injections. Below, the control volume concept is extended to complete thermodynamic balancing in HME devices by variation of the water-to-air mass flow rate ratio along the process path.

Figure 2:
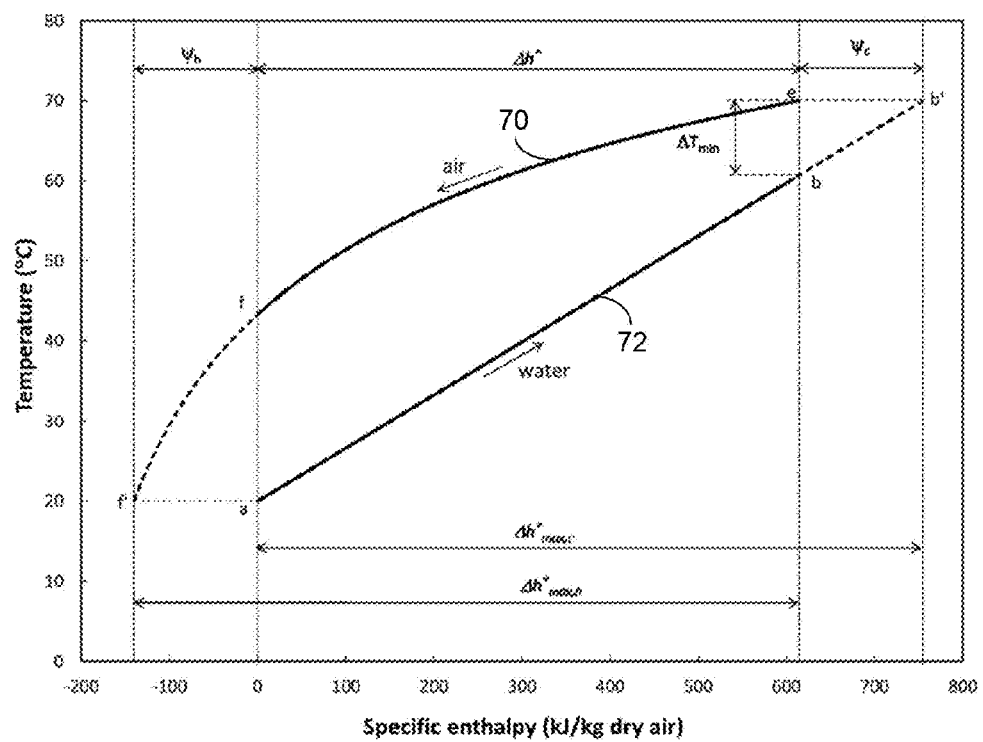
FIG. 2 is a temperature-versus-enthalpy diagram representing the dehumidification process highlighting the maximum change in enthalpy rates (per kg of dry air) that can be achieved by each of the fluid streams ($\Delta h_{max,c}$ and $\Delta h_{max,h}$) and the terminal enthalpy pinches ($\psi_c$ and $\psi_h$).

Enthalpy Pinch: Novel Parameter to Define Performance of HME Device:

To clearly visualize the simultaneous heat and mass transfer process, an approximate plot of temperature versus enthalpy for a dehumidifier is provided in FIG. 2, where the path 70 from e to f represents the process path for dehumidification of the moist air, and the path 72 from a to b represents the process path for energy capture by the seawater stream. Points f' and b' represent the hypothetical ideal states that the moist air and water stream would, respectively, reach if the dehumidifier were of infinite size. Hence, $h^*|_{f'} - h^*|_f$ (represented as $\psi_h$) and $h^*|_{b'} - h^*|_b$ (represented as $\psi_c$) is the loss in enthalpy rates (per unit amount of dry air circulated in the system) because of having a "finite-sized" HME device. This is the loss that cannot be reduced by thermal balancing of the device at a control-volume balanced condition (without increasing the area associated with the heat and mass transfer in the device). For a given device, this is the loss that represents the energy effectiveness ($\epsilon$) of the device and is directly related to the conventional definition of exchanger effectiveness. This definition of effectiveness for a heat and mass exchanger is given as:

$$\varepsilon = \frac{\Delta \dot{H}}{\Delta \dot{H}_{max}} \quad (2)$$

The maximum change in total enthalpy rate is the minimum of that for the cold and the hot stream.

$$\Delta \dot{H}_{max} = \min(\Delta \dot{H}_{max,c}, \Delta \dot{H}_{max,h}) \quad (3)$$

It is advantageous to normalize enthalpy rates by the amount of dry air flowing through the system for easy representation of the thermodynamic processes in enthalpy versus temperature diagrams. Using this concept, the following equation is derived from Eq. (2) by dividing the numerator and the denominator by the mass flow rate of dry air ($\dot{m}_{da}$).

$$\varepsilon = \frac{\Delta h^*}{\Delta h^*_{max}} \quad (4)$$

$$= \frac{\Delta h^*}{\Delta h^* + \Psi_{TD}} \quad (5)$$

$\Psi_{TD}$ is the loss in enthalpy rates at terminal locations because of having a "finite-sized" HME device and is defined as follows:

$$\Psi_{TD} = \min\left(\frac{\Delta \dot{H}_{max,c}}{\dot{m}_{da}} - \Delta h^*, \frac{\Delta \dot{H}_{max,h}}{\dot{m}_{da}} - \Delta h^*\right) \quad (6)$$

$$= \min(\Psi_c, \Psi_h) \quad (7)$$

In the case of a heat exchanger, $\Psi_{TD}$ is analogous to the minimum terminal stream-to-stream temperature difference (TTD). Assuming the hot stream is the minimum heat capacity stream, the equations for the effectiveness of a heat exchanger may be derived as provided below (Eqs. 8 and 9).

$$\varepsilon_{HE} = \frac{(\dot{m}c_p)_h \Delta T_h}{(\dot{m}c_p)_h (T_{h,in} - T_{c,in})} \quad (8)$$

$$= \frac{\Delta T_h}{\Delta T_h + \frac{(T_{h,out} - T_{c,in})}{TTD_h}} \quad (9)$$

The extension to the case where the cold stream is the minimum heat capacity stream is similar. By comparing Eqs. 5 and 9, the analogy is clear.

Figure 3:
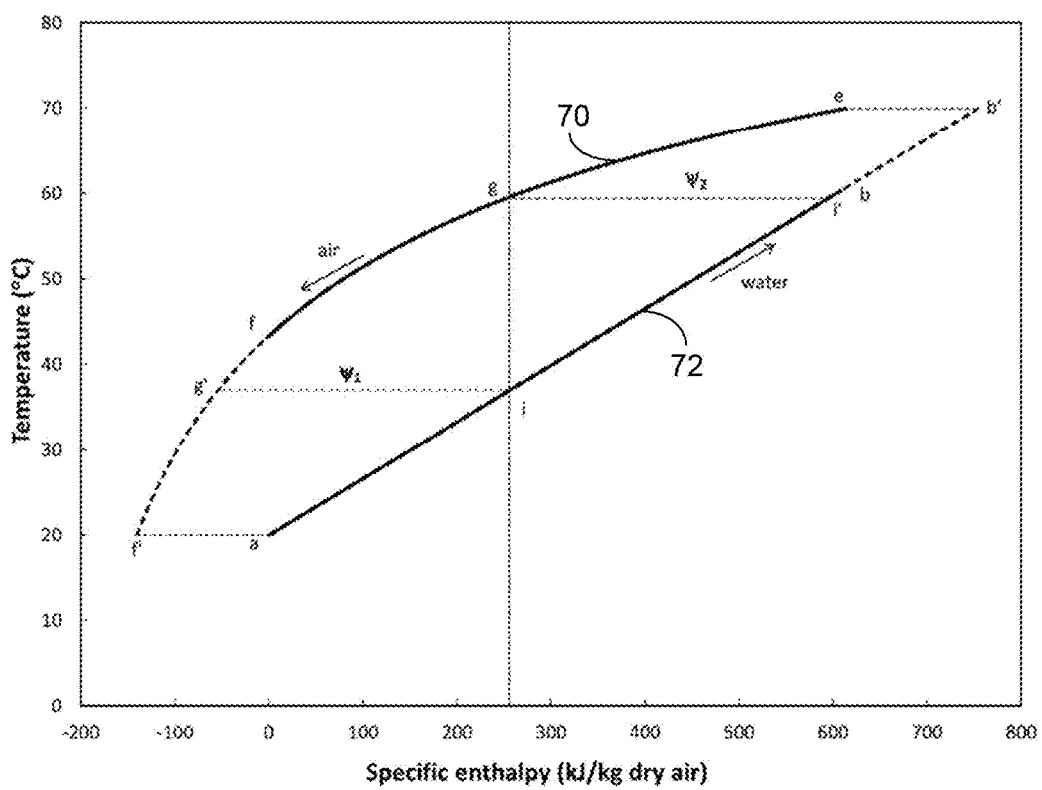
FIG. 3 is a temperature-versus-enthalpy diagram for the dehumidification process highlighting "loss in ideal enthalpy" or enthalpy pinch at any given location ($\psi_{local}$) as a measure of local effectiveness in HME devices.

TTD is seldom used to define performance of a heat exchanger in thermodynamic analyses; instead, temperature pinch is the commonly used parameter. The difference is that temperature pinch is the minimum stream-to-stream temperature difference at any point in the heat exchanger and not just at the terminal locations. Like temperature pinch, $\psi$ can be defined as the minimum loss in enthalpy rate due to a finite device size at any point in the exchanger and not just at the terminal locations. This minimum loss is accomplished, as shown in FIG. 3, by considering infinitely small control volumes represented by just two states (g for air and i for water). We can define the ideal states for each of these real states as g' and i'. The local $\psi$ at this location can be defined as the minimum $h|_i - h|_i$ (represented as $\psi_2$) and $h|_g - h|_{g'}$ (represented as $\psi_1$). Thus, the general definition of $\psi$ will be as follows:

$$\Psi = \min_{local}(\Delta h^*_{max} - \Delta h^*) \quad (10)$$

Hence, based on the arguments presented in this section, $\psi$ for an HME device is analogous to temperature pinch for an HE, and it can be called the "enthalpy pinch". Because of the presence of the concentration difference as the driving force for mass transfer in HME devices, it may be advantageous not to use a temperature pinch or a terminal temperature difference when defining the performance of the device.

Figure 4:
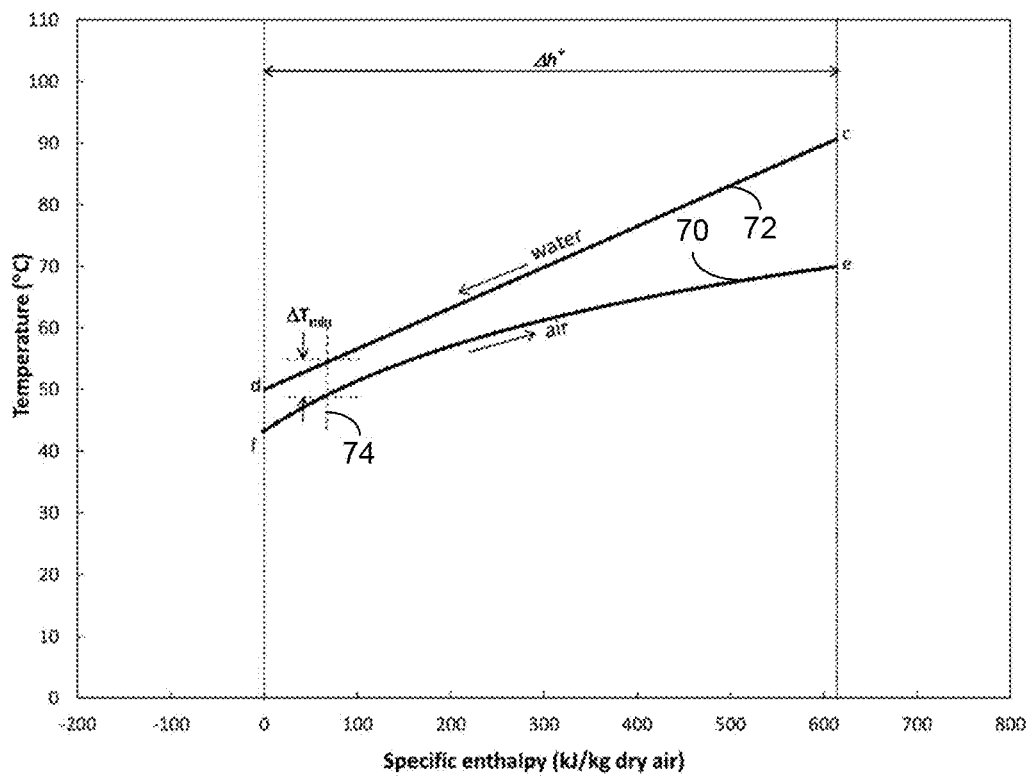
FIG. 4 is a temperature-versus-enthalpy diagram representing the humidification process and highlighting the "pinch point" occurring at an intermediate location rather than at a terminal one.

Energy effectiveness is another commonly used performance metric for HEs and HMEs. Energy effectiveness, however, is a control volume parameter and accounts for only terminal differences. In order to design for balancing, local differences are considered. Considering the temperature profile of a humidification process, as shown in FIG. 4, the "pinch" point 74 does not occur at the terminal locations but rather at an intermediate point. This behavior is not captured if the performance of the device is defined by energy effectiveness. In the extreme case, high values of effectiveness for the humidifier could lead to an internal temperature and concentration cross. This problem does not arise with $\psi$ because it is a local parameter and is, hence, used to define the performance of HME devices (humidifiers and dehumidifiers) herein.

Mass Extractions and/or Injections Based Balancing:

As described, above, a value of unity for the modified heat capacity rate ratio defines a thermally balanced state for a control volume without extractions. For such a case, HCR is not equal to unity at all locations in the device. With mass extractions or injections, the slope of the water line 72 can be varied such that HCR is one throughout the device. This is the operating condition at which the HME device is completely balanced. The expression for HCR is rewritten in terms of $\psi_c$ and $\psi_h$ to understand this concept.

$$HCR = \frac{\Delta \dot{H}_{max,c}}{\Delta \dot{H}_{max,h}} \quad (11)$$

$$= \frac{\Delta h^* + \Psi_c}{\Delta h^* + \Psi_h}. \quad (12)$$

When HCR=1 for the control volume, $\psi_{TD,c} = \psi_{TD,h}$; when HCR=1 at all locations, $\psi$=constant.

To vary the water-to-air mass flow rate ratio such that HCR=1 at every location in the device (or conversely $\psi$=constant at every point) extractions or injections may be needed at every point (i.e., the number of extractions and/or injections approach infinity). We call this "continuous thermodynamic balancing". Even though continuous thermodynamic balancing has theoretical significance in understanding systems with mass extraction and injection, in practice it may be difficult to achieve. Hence, balancing an HME device with a finite number of extractions/injections is also evaluated herein.

Figure 5:
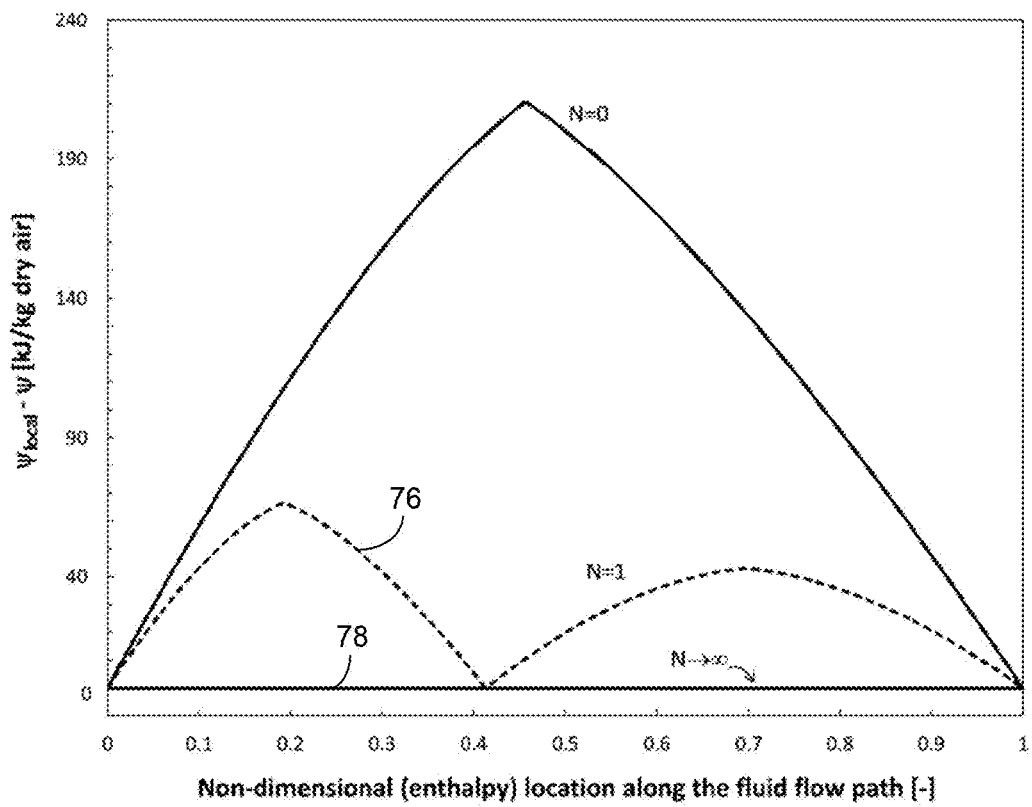
FIG. 5 is a plot of local enthalpy pinch values ($\psi_{local}$) relative to the overall enthalpy pinch ($\psi$) to illustrate the effect of injections in a dehumidifier with the control-volume-balanced case.

As can be understood by reviewing FIGS. 2 and 3, in a "control volume" balanced dehumidifier without injections, the local $\psi$ minimum is at the two terminal locations (also see Eq. 13); and, at all intermediate points, ψ is higher. This results from the nature of the temperature-enthalpy diagram as discussed in more detail, below. The local variation of ψ in the control-volume-balanced case is illustrated in FIG. 5. In FIG. 5 (and elsewhere herein), the specific enthalpy per kg of dry air (used to describe the control volume location in FIGS. 2 and 3) is normalized by the total heat duty ($\Delta h^*$). As may be observed from FIG. 5, a single injection (N=1) brings ψ to a minimum value at one intermediate location (or conversely brings HCR equal to 1 at that location and the two terminal ones), as shown by plot 76. Where the number of injections approaches infinity (N≈∞), as shown by plot 78, the local value of ψ can be minimum and constant throughout the length of the device (Eq. 14). The direction of injection of air is into the dehumidifier. Since, the water-to-air mass flow rate ratio is varied to balance the device (and not individual mass flow rates), we can equivalently inject water from the (counter-flow) dehumidifier.

Figure 6:
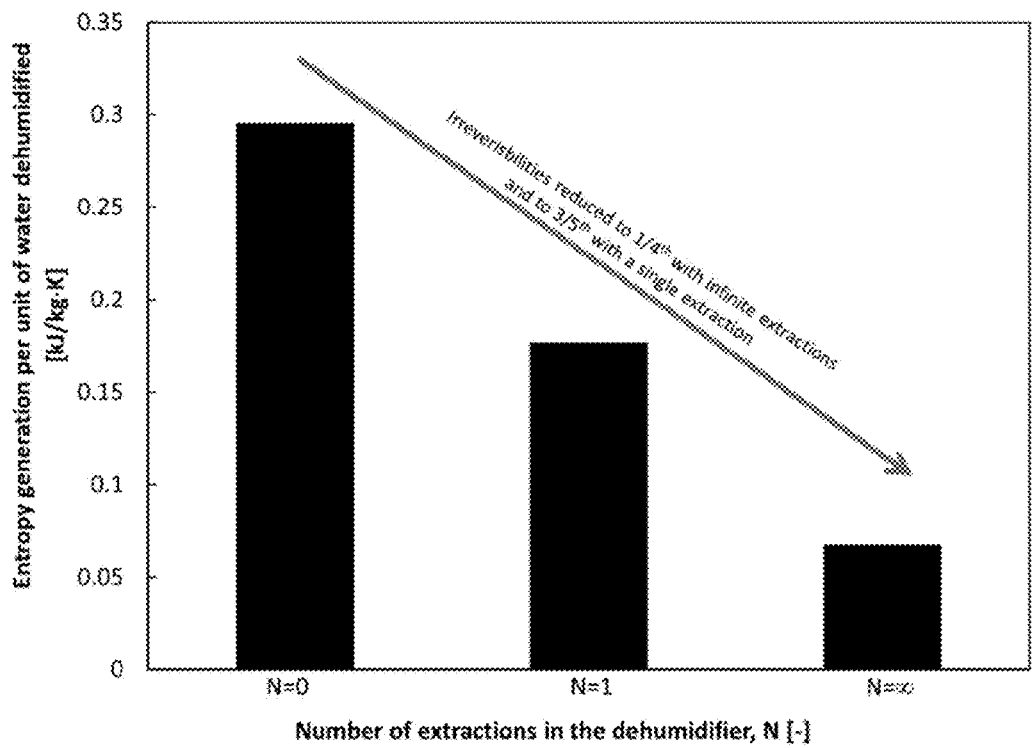
FIG. 6 is a plot show the effect of injection on the irreversibility in the dehumidifier evaluated at $T_a = 20°$ C.; $T_e = 70°$ C.; $\psi_{deh} = 20$ kJ/kg dry air; HCR=1.

FIG. 6 illustrates the effect of continuous and single extraction/injection on the total irreversibility in the dehumidifier. The entropy produced per unit amount of condensed water is reduced to a quarter with continuous extraction/injection and to ⅗th with a single extraction/injection. This result is representative of an optimal case. Such a large reduction demonstrates the importance of thermodynamic balancing for heat and mass exchangers.

Functional Form for Continuous Thermodynamic Balancing:

Considering Eq. 14, we can express the closed form expressions (Eqs. 15-20) for the temperature and humidity ratio profiles for the fluid streams in a completely balanced dehumidifier and humidifier. If the process path for air (represented in an enthalpy-temperature diagram) follows a function ξ (Eq. 15), then the mass flow rate ratio is varied in the dehumidifier such that the seawater process path is the same function of enthalpy, but shifted by Eq. 17. A similar shift in the enthalpy is also followed in the humidity profile (Eqns. 16 and 18).

$$T_a = \xi(h^*) \quad (15)$$

$$\omega = \eta(h^*) \quad (16)$$

$$T_\omega = \xi(h^* - \psi) \quad (17)$$

$$\omega_{int} = \eta(h^* - \psi) \quad (18)$$

Figure 7:
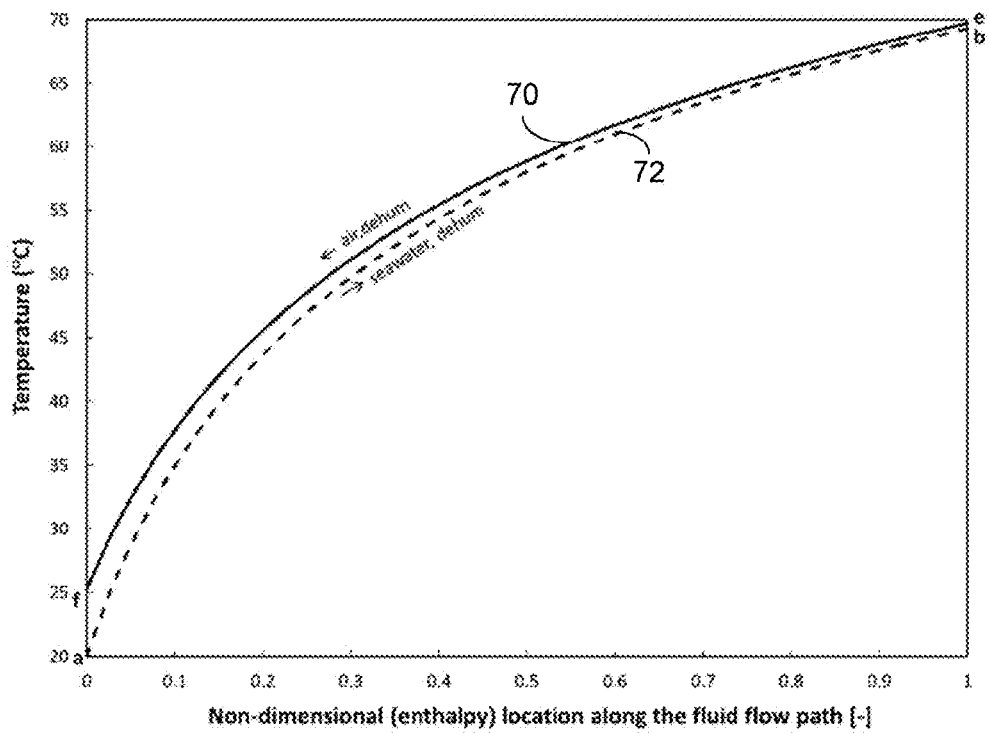
FIG. 7 is a plot of the temperature profile in a dehumidifier with complete thermodynamic balancing by continuous injection.
Figure 8:
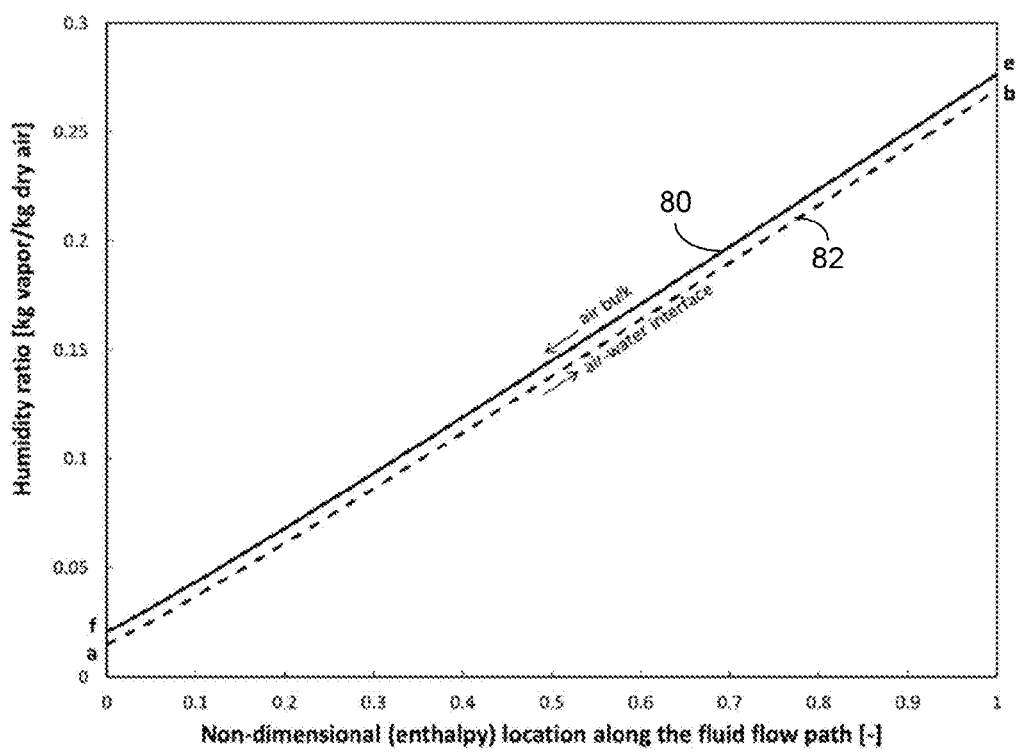
FIG. 8 is a plot of the humidity ratio profile in a dehumidifier with complete thermodynamic balancing by continuous injection.

An example of a temperature and humidity profile in a dehumidifier with continuous injection is illustrated in FIGS. 7 and 8, respectively. One can see from FIGS. 7 and 8 that a dehumidifier with continuous mass injections (such that HCR=1 throughout the device) has a profile close to a constant driving humidity difference rather than a constant temperature difference. Driving humidity difference is calculated as the difference in the local humidity ratio of the bulk air stream 80 (evaluated at a bulk temperature) and the humidity ratio of the interface 82 (evaluated as saturated at the interface temperature). This is a significant conclusion, and it also leads us to conclude that balancing for temperature differences alone (as carried out by known previous studies) will not lead to a thermodynamic optimum.

For a completely balanced humidification device, the concept is similar. For a moist air line represented by Eqs. 15 and 16, the humidifier water lines will be given by:

$$T_w = \xi(h^* + \Psi) \quad (19)$$

$$\omega_{int} = \eta(h^* + \Psi) \quad (20)$$

The complete extraction/injection profiles can be obtained by only varying the water-to-air mass flow rate ratio. This can be done by continuous extraction or injection of either the air or the water (or both) from or into the HME device.

Modeling of HDH Systems:

In this section, the concepts of thermodynamic balancing developed for HME devices are applied to the HDH system design. An embodiment of the system under study is illustrated in FIG. 1.

Figure 9:
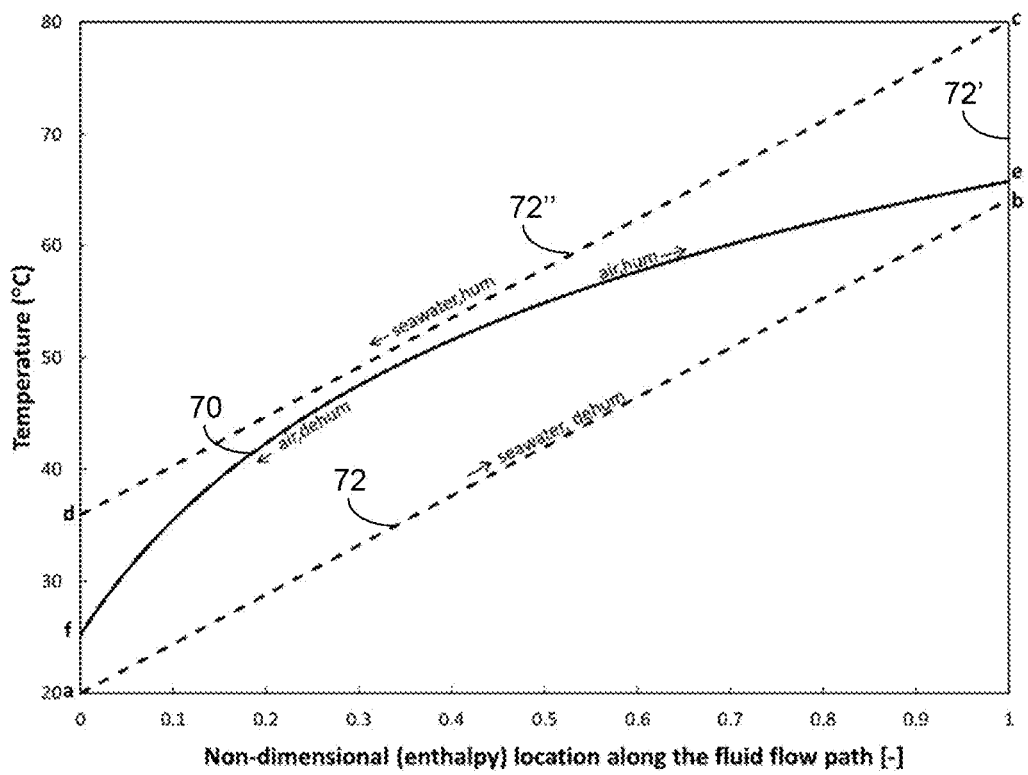
FIG. 9 plots the temperature profile representing the HDH system without extractions or injections, where the boundary conditions are $T_a = 20°$ C.; $T_c = 80°$ C.; $\psi_{deh} = \psi_{hum} = 20$ kJ/kg dry air.

System without Extractions/Injections:

A temperature-enthalpy diagram for the HDH system without extractions/injections (illustrated in FIG. 1) is shown in FIG. 9. The process line 70 for the air is represented by the saturation line e-f in the humidifier and the dehumidifier. The uncertainty in the calculated performance of the HDH system as a result of the approximation that air is saturated all along its process path is small and is discussed in detail, below. The seawater process line is represented by a-b (72) in the dehumidifier, by b-c (72') in the heater and by c-d (72") in the humidifier.

A detailed algorithm to design this system using the top brine temperature, the feed water temperature and the component enthalpy pinches as input variables is elucidated below.

For a system with no extractions/injections (N=0), the following steps are followed:

1) a value for total heat duty ($\Delta h^*$) is picked;
2) a saturated air temperature profile [T=ξ(h*)] is plotted;
3) a linear dehumidifier temperature profile satisfying ψ at both ends is plotted;
4) the total enthalpy range is divided into small equal control volumes (CVs);
5) $\Delta s_{w,1}$ (per kg of seawater) is calculated from seawater properties in one of the small control volumes;
6) $\Delta s_{w,2}$ (per kg of dry air) is calculated graphically;
7) the mass flow rate ratio for the humidifier stream is calculated as $\Delta s_{w,2}/\Delta s_{w,1}$;
8) Δω is calculated using ω=η/(h*);
9) the mass flow rate of water produced in the control volume is calculated;
10) the mass flow rate of the seawater stream exiting the small control volume is calculated;
11) the slope of the humidifier temperature profile is calculated;
12) the lower temperature of the water stream in the interval in the humidifier is calculated;
13) the process of steps 5-12 is repeated for all intervals, and the humidifier temperature profile is generated;
14) the minimum enthalpy pinch between the water and air streams in the humidifier is calculated;
15) an evaluation is made as to whether the error on the humidifier enthalpy pinch is small (if yes, proceed to step 16; if not, return to step 1);
16) the total entropy generation is calculated;
17) the heat input is calculated; and
18) the gained output ratio is calculated.

The above solution is iterative, and the thermophysical properties are evaluated as described below.

The understanding that the slope of the water line in the temperature versus enthalpy diagram can be used to evaluate the mass flow rate ratio at any given point in the HME devices is utilized in the analysis:

$$\text{slope} = \frac{dT_\omega}{dh^*} = \frac{1}{m_r c_{p,\omega}} \quad (21)$$

Further, the entropy of the varies states evaluated using the temperature-enthalpy diagram may be used to evaluate the mass flow rate in the humidification and the dehumidification devices.

Figure 10:
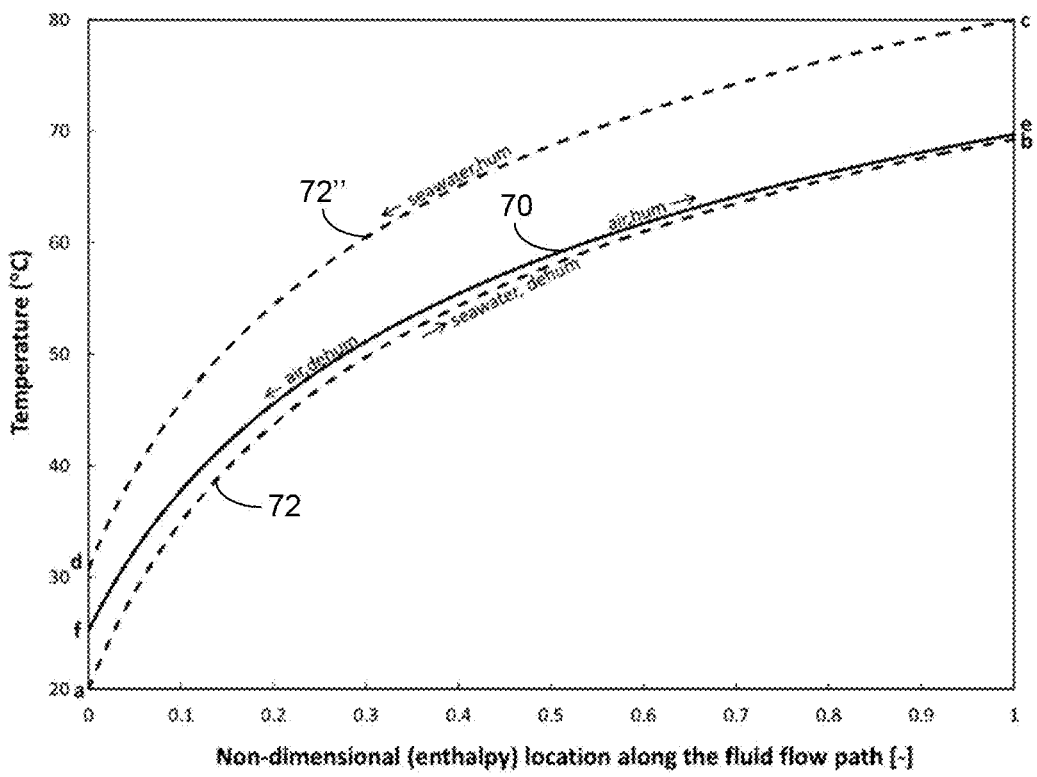
FIG. 10 plots the temperature profile representing the HDH system with continuous injections to completely balance the dehumidifier, where the boundary conditions are $T_a = 20°$ C.; $T_c = 80°$ C.; $\psi_{deh} = \psi_{hum} = 20$ kJ/kg dry air.
Figure 11:
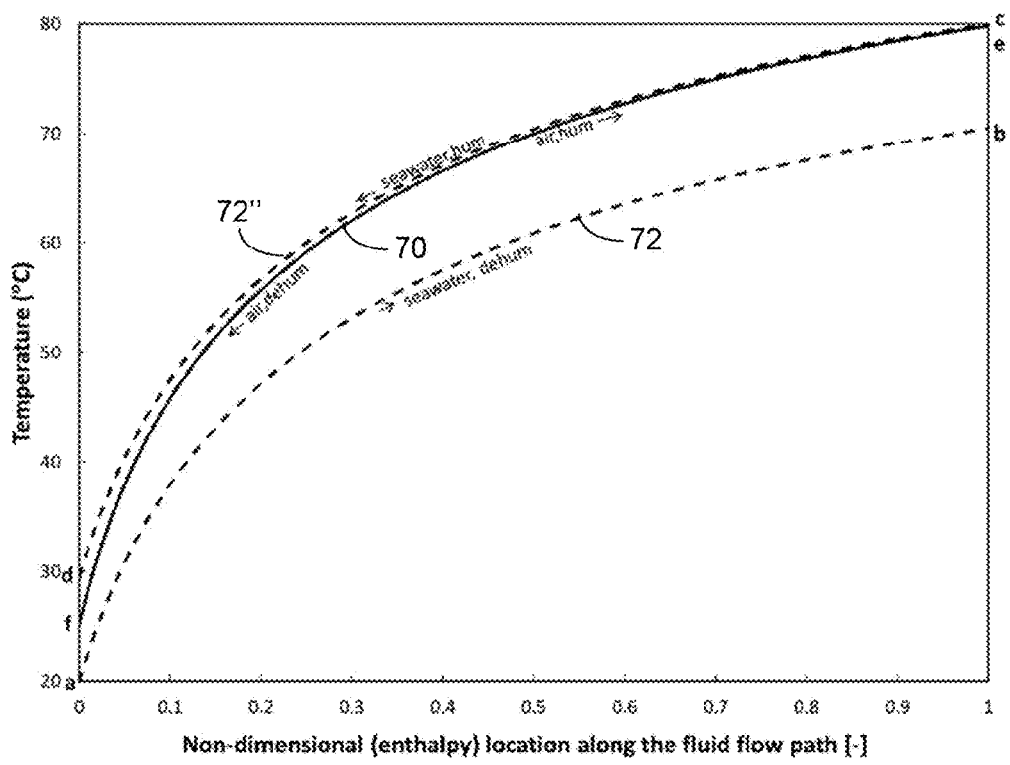
FIG. 11 plots the temperature profile representing the HDH system with continuous injections to completely balance the humidifier, where the boundary conditions are $T_a = 20°$ C.; $T_c = 80°$ C.; $\psi_{deh} = \psi_{hum} = 20$ kJ/kg dry air.

System with Infinite Extractions and Injections:

Equations 15-20 can be utilized to design systems with infinite extraction/injection such that the remanent irreversibility in one of the humidifier or the dehumidifier is zero. FIGS. 10 and 11 illustrate the application of the aforementioned equations in system design via temperature versus location diagrams. From a pinch point perspective, the temperature pinch in the humidifier and the dehumidifier are at different terminal ends in the "dehumidifier-balanced" and "humidifier-balanced" cases. The enthalpy pinch, however, is minimum and constant at all points in the dehumidifier and humidifier in the two respective cases.

A detailed procedure to model the system with infinite extractions/injections can be outlined as follows:

1) total heat duty ($\Delta h^*$) is estimated by assuming parallel temperature profiles for the dehumidifier and humidifier;
2) a saturated air temperature profile $[T=\xi(h^*)]$ is plotted;
3) a dehumidifier temperature profile $[T=\xi(h^*-\psi)]$ is plotted;
4) the total enthalpy range is divided into small equal intervals;
5) $\Delta s$ (per kg of water) is calculated;
6) $\Delta s$ (per kg of dry air) is calculated;
7) the mass flow rate ratio for the humidifier stream is calculated;
8) $\Delta \omega$ is calculated;
9) the mass flow rate of the water produced in the interval is calculated
10) the mass flow rate of the water stream in the humidifier in the following interval is calculated;
11) the salinity of the water stream in the humidifier is calculated;
12) the specific heat of the water stream in the humidifier is calculated;
13) the slope of the humidifier temperature profile is calculated;
14) the lower temperature of the water stream in the interval in the humidifier is calculated;
15) the process of steps 5-14 is repeated for all intervals, and the humidifier temperature profile is generated;
16) state A is defined with $h_A = h_{sat}(T_{fw}) + \psi$ and $T_A = T_{sat}(h_A)$;
17) state B is defined for the water stream in the humidifier with $h_B = h_{sat}(T_{fw})$, and $T_B$ is determined from the humidifier temperature profile at $h_B$;
18) the entire humidifier temperature profile is shifted upwards by $\Delta T = T_A - T_B$;
19) the total entropy generation is calculated;
20) the heat input is calculated; and
21) the gained output ratio is calculated.

In developing this procedure, we put in place a constraint that the state (temperature and humidity) of the injected stream is the same as the stream it is injected into. This constraint is imposed to avoid generating entropy because of mixing of streams at dissimilar states. Further, air in the dehumidifier has the same inlet and outlet temperature and humidity unlike water, which has a different streamwise temperature in the humidifier and the dehumidifier (because of the presence of the heater).

Figure 12:
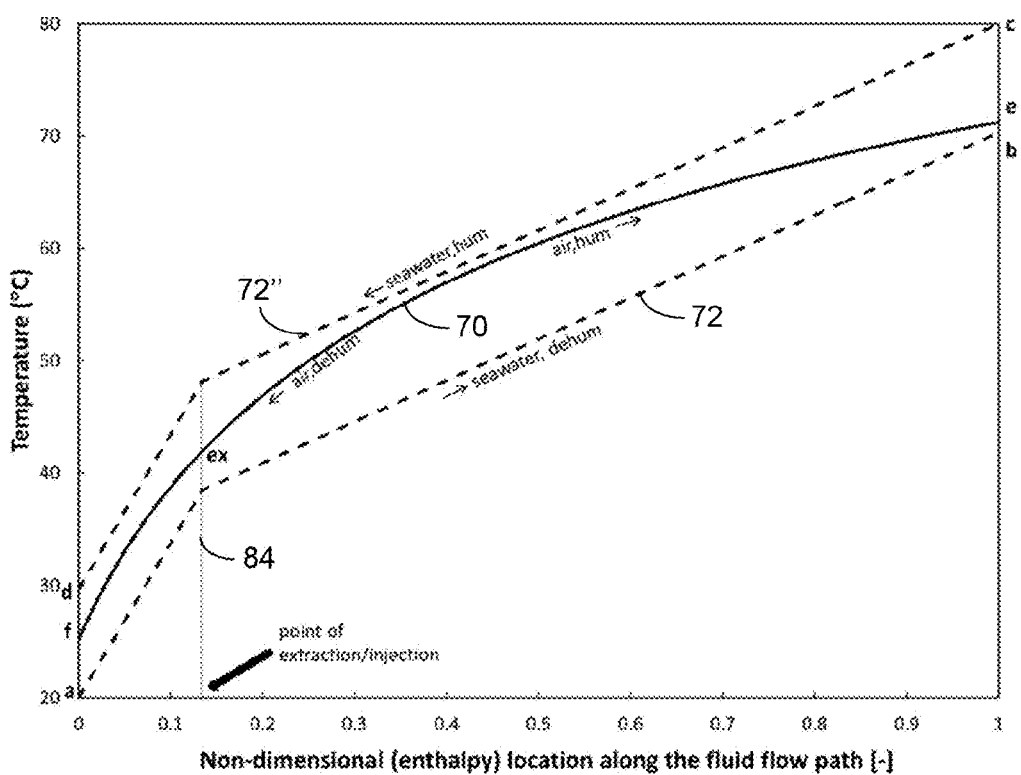
FIG. 12 plots the temperature profile representing the HDH system with a single extraction and injection, where the boundary conditions are $T_a = 20°$ C.; $T_c = 80°$ C.; $\psi_{deh} = \psi_{hum} = 20$ kJ/kg dry air.

System with a Single Extraction and Injection:

It may be more practical to apply a finite number of extractions and injections in the HDH system. Hence, the effect of a single extraction/injection is studied here along with that of infinite extractions/injections. FIG. 12 illustrates a temperature profile of a system with a single extraction and injection. In the illustrated case, the air was extracted from the dehumidifier at the state "ex" at location 84 and injected in a corresponding location in the humidifier with the same state "ex" (also at location 84) to avoid generating entropy during the process of injection. This criteria for extraction is applied for all the cases reported in this paper since it helps us study the effect of thermodynamic balancing, independently, by separating out the effects of a temperature and/or a concentration mismatch between the injected stream and the fluid stream passing through the HME device, which when present can make it hard to quantify the reduction in entropy generated due to balancing alone.

A detailed procedure to model the system with a single air extraction and injection is outlined as follows:

1) a value for total heat duty ($\Delta h^*$) is picked;
2) the enthalpy of the injection point in the dehumidifier is picked;
3) a saturated air temperature profile $[T=\xi(h^*)]$ is plotted;
4) a dehumidifier temperature profile (2 lines) satisfying $\psi$ at both ends and at the injection point is plotted;
5) the total enthalpy range is divided into small equal intervals;
6) $\Delta s$ (per kg of water) is calculated;
7) $\Delta s$ (per kg of dry air) is calculated;
8) the mass flow rate ratio for the humidifier stream is calculated;
9) $\Delta \omega$ is calculated;
10) the mass flow rate of water produced in the interval is calculated;
11) the mass flow rate of the water stream in the humidifier in the following interval is calculated;
12) the salinity of the water stream in the humidifier is calculated;
13) the specific heat of the water stream in the humidifier is calculated;
14) the slope of the humidifier temperature profile is calculated;
15) the lower temperature of the water stream in the interval in the humidifier;
16) the process of steps 6-15 is repeated for all intervals, and the humidifier temperature profile is generated;
17) the minimum enthalpy pinch between the water and air streams in the humidifier is calculated;
18) an evaluation is made as to whether the error on the humidifier enthalpy pinch is small (if yes, proceed to step 19; if not, (a) if all injection points for this heat duty have been tried, return to step 1 or (b) if all injection points for this heat duty have not been tried, return to step 2;
19) the total entropy generation is calculated;
20) the heat input is calculated; and
21) the gained output ratio is calculated.

Results and Discussion:

In this section, the effect that thermodynamic balancing can have on the energy performance of the HDH system is investigated. The performance parameter of interest in this study is the gained-output-ratio (GOR). GOR is the ratio of the latent heat of evaporation of the water produced to the net heat input to the cycle. This parameter is, essentially, the effectiveness of water production, which is an index of the amount of the heat recovery affected in the system.

$$GOR = \frac{\dot{m}_{pw} \cdot h_{fg}}{\dot{Q}_{in}} \quad (22)$$

Latent heat is calculated at the average partial pressure of water vapor (in the moist air mixture) in the dehumidifier.

The recovery ratio (RR) is another parameter of interest in this study. RR is the amount of water desalinated per unit amount of feed entering the system.

$$RR = \frac{\dot{m}_{pw}}{\dot{m}_w} \quad (23)$$

Figure 13:
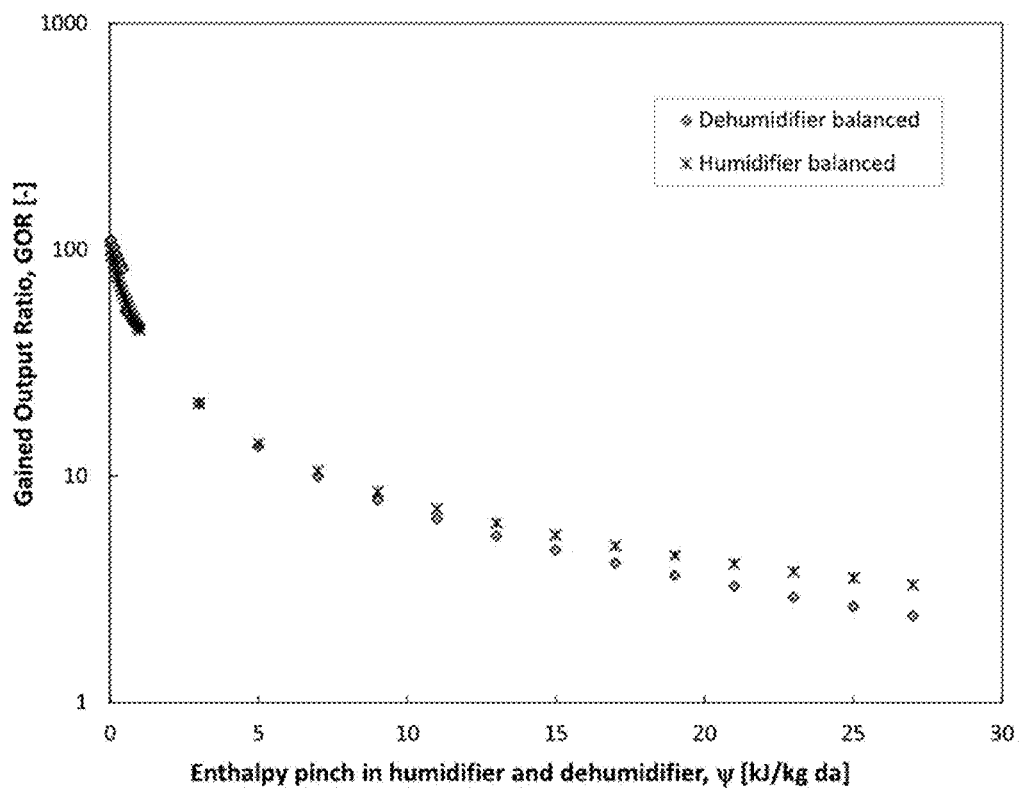
FIG. 13 provides a comparison of the performance of the HDH system with infinite extractions for complete thermodynamic balancing of the humidifier with that for complete thermodynamic balancing of the dehumidifier; the boundary conditions are as follows: $T_a = 20°$ C.; sal=35 g/kg; $T_c = 80°$ C.; $N = \infty$; $HCR_{deh} = 1$.

Comparison of Dehumidifier Balanced and Humidifier Balanced Systems:

In FIGS. 10 and 11, the temperature profiles for two HDH systems were illustrated: one with a balanced dehumidifier (FIG. 10) and the other with a balanced humidifier (FIG. 11). In this section, the performance of these two systems is compared at various values of enthalpy pinch. As may be observed from FIG. 13, where the humidifier-balanced system is plotted with asterisks and the dehumidifier-balanced system is plotted with diamonds, the performance is fairly similar. At lower values of enthalpy pinch ($\psi$<7 kJ/kg dry air), the dehumidifier-balanced system has a slightly higher performance; and at higher values of enthalpy pinch, the humidifier-balanced system is marginally better in terms of GOR.

Figure 14:
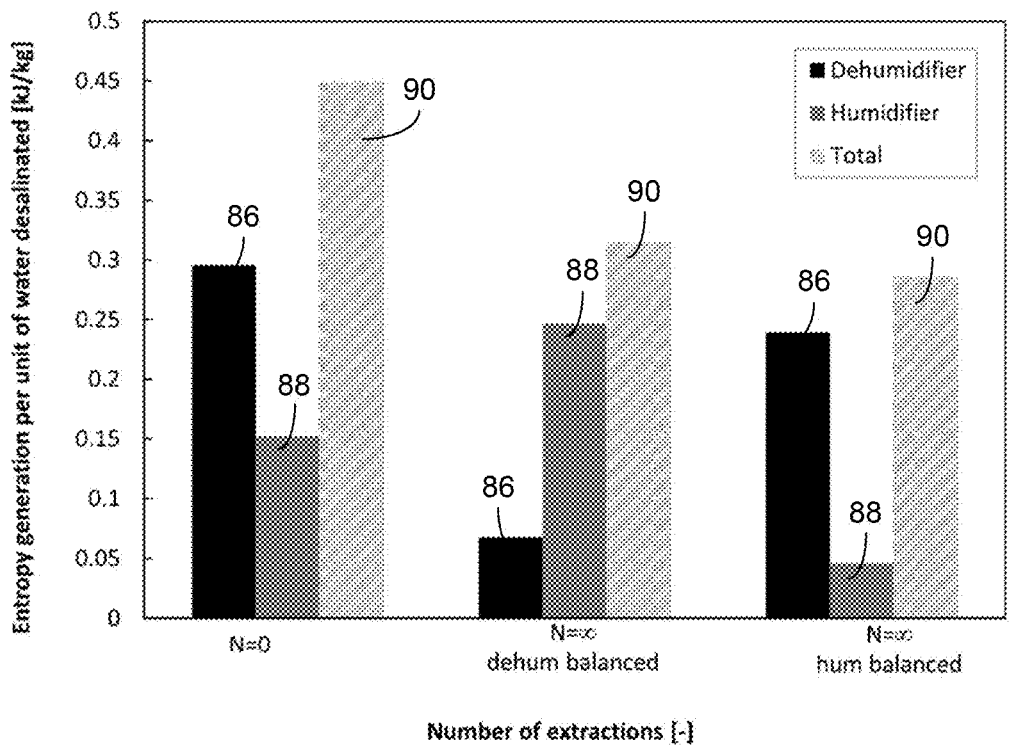
FIG. 14 shows the reduction in total system irreversibility with complete thermodynamic balancing of either the humidifier or the dehumidifier in HDH, where the boundary conditions are as follows: $T_a = 20°$ C.; sal=35 g/kg; $T_c = 80°$ C.; $\psi_{deh} = \psi_{hum} = 20$ kJ/kg dry air; $HCR_{deh} = 1$ or $HCR_{hum} = 1$.

To understand the similar GOR values for the two systems studied in this section, consider FIG. 14. The entropy generated in the humidifier 88 and in the dehumidifier 86 per kilogram of water desalinated in the system is illustrated for a fixed top brine temperature, feed water temperature and enthalpy pinches in the humidifier and in the dehumidifier. When the dehumidifier is completely balanced for this system, the entropy generated in the dehumidifier 86 is reduced to a quarter of that in a system without mass extractions and injections. The entropy generated in the humidifier 88, however, is increased by 65%. While balancing the dehumidifier 86, the humidifier 88 is moving away from the balanced state. In the system with a completely balanced humidifier, the entropy generation in the humidifier 88 is reduced to less than a third of that in a system without mass extractions or injections. The entropy generated in the dehumidifier 86 changes little. The total entropy 90 generated in the system per kg of water desalinated is about the same for both systems discussed here; and, hence, these systems have a similar GOR value. A similar trend is also observed for other boundary conditions.

In conclusion, based on studying the changes in entropy generated due to balancing in the various cases reported in this section, the reduction in total system entropy generation due to continuous balancing was found to be very similar at the same enthalpy pinches for the "dehumidifier-balanced" and the "humidifier-balanced" systems. Hence, the GOR was also found to be similar for these two systems.

Figure 15:
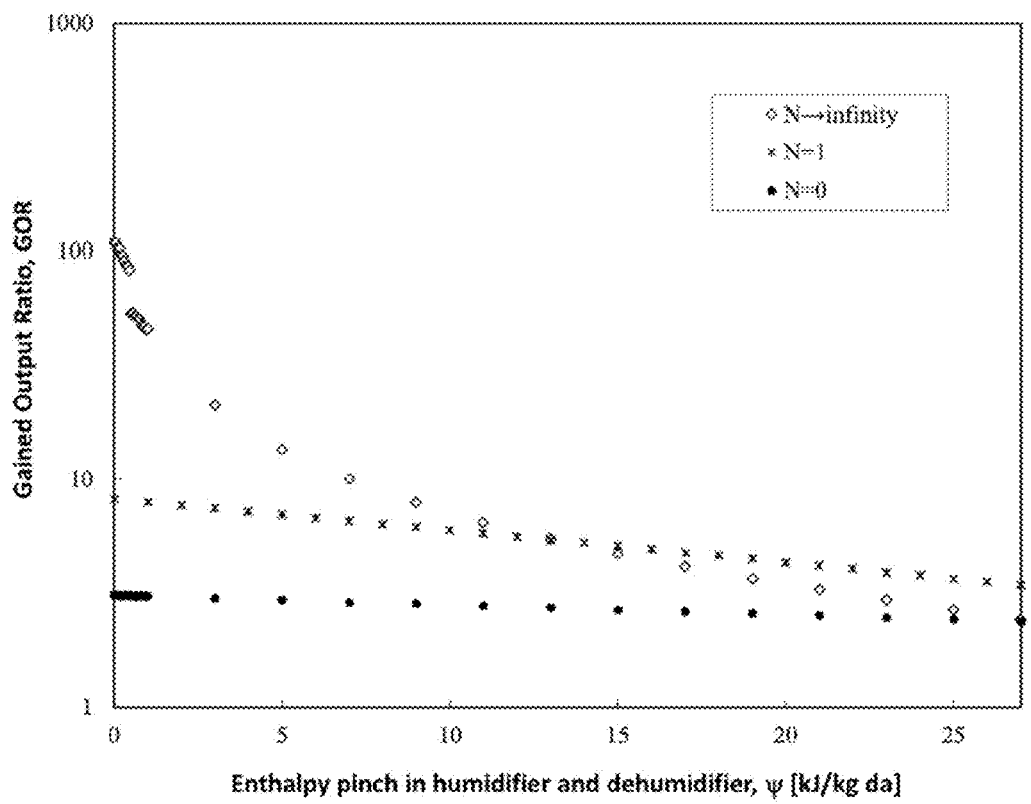
FIG. 15 shows the effect of the number of extractions/injections (for thermodynamic balancing) on the performance of the HDH system with finite- and infinite-size HME devices, where the boundary conditions are as follows: $T_a=20°$ C.; sal=35 g/kg; $T_c=80°$ C.; $HCR_{deh}=1$.

Effect of Number of Extractions/Injections:

The effect of the number of extractions/injections (at various enthalpy pinches) on the performance of the HDH system is shown in FIG. 15, where the infinite-extractions/injections system is plotted with diamonds; the single-extraction/injection system is plotted with asterisks; and the no-extraction system is plotted with circles. Several important observations can be made from this chart.

First, it may be observed that thermodynamic balancing is effective in HDH cycles only when the humidifier and the dehumidifier have an enthalpy pinch less than about 27 kJ/kg dry air. For various boundary conditions, it has been found that beyond the aforementioned value of enthalpy pinch, the difference in performance (GOR) with that of a system without any extractions or injections is small (i.e., less than 20%). Further, at very low values of the enthalpy pinch ($\psi \leq 7$ kJ/kg dry air) in the humidifier and in the dehumidifier, continuous balancing with an infinite number of extractions and injections was found to produce results much better than those obtained with a single extraction and injection. For the top brine temperature of 80° C., a feed water temperature of 20° C. and an "infinitely" large humidifier and dehumidifier ($\psi_{hum}=\psi_{deh}=0$ kJ/kg dry air), the GOR was found to be 8.2 for a single extraction/injection (compared to a GOR of 109.7 for a similar system with infinite extractions/injections). At higher values of enthalpy pinch (7 kJ/kg dry air<$\psi \leq 15$ kJ/kg dry air), a single extraction/injection reduced the entropy generation of the total system roughly by an amount similar to that produced with an infinite number of extractions/injections. At even higher values of enthalpy pinch (15 kJ/kg dry air<$\psi \leq 27$ kJ/kg dry air), a single extraction outperforms infinite extractions, which may be viewed as a surprising result. We try to understand this by looking at how the infinite and single-extraction/injection balancing affect the entropy generation in the humidifier 88 and dehumidifier 86 (see FIG. 16).

Figure 16:
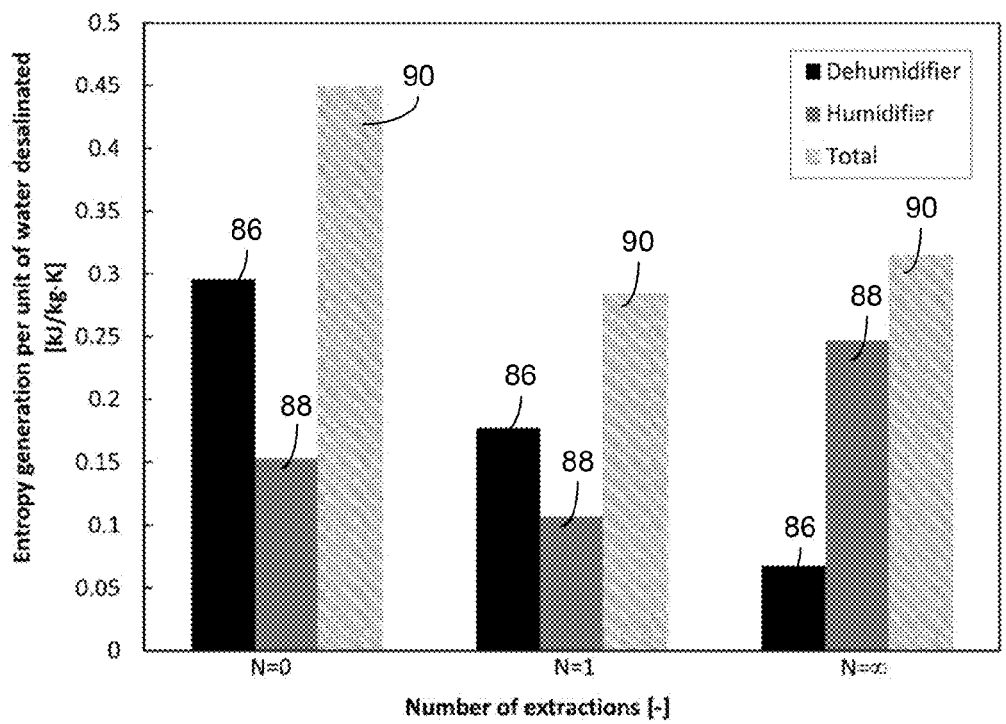
FIG. 16 shows the effect of extraction on total system irreversibilities, where the boundary conditions are as follows: $T_a=20°$ C.; sal=35 g/kg; $T_c=80°$ C.; $\psi_{deh}=\psi_{hum}=20$ kJ/kg dry air; $HCR_{deh}=1$.

FIG. 16 illustrates the entropy generated in the humidifier 88 and in the dehumidifier 86 in systems with zero, one and infinite extractions/injections at component enthalpy pinches of 20 kJ/kg dry air. It may be observed that when continuous extractions/injections are applied, the entropy generated in the balanced component (i.e., in the dehumidifier 86) is reduced, but the entropy generated in the humidifier 88 is increased. In other words, the humidifier is "de-balanced" as the dehumidifier is balanced. For the single-extraction/injection case, even though the entropy generated in the dehumidifier 86 is reduced by an amount smaller than the reduction in generated entropy in the infinite extractions/injections case, the humidifier is not de-balanced. Thus, the total entropy generated 90 is lower in the single-extraction/injection case, and the GOR is higher.

Further, it is possible to design a system with continuous extraction/injection that neither balances the humidifier nor the dehumidifier fully but balances both partially. Such a system is likely to have a higher performance than a single-extraction/injection system.

Exemplary Applications:

The methods and apparatus described herein can be used, for example, to provide water purification in small rural communities. The energy source (e.g., biomass) in such applications may provide low-grade energy, yet biomass is often the best option because of the non-availability of fossil fuels and lack of a reliable electric grid. The methods described herein can improve the energy efficiency of a basic HDH system (run using low-grade heat) by up to 100%. This improvement in energy efficiency helps reduce the energy cost, bringing the system to possible fruition providing purified water to small rural communities.

Another promising application for these methods and apparatus, in the United States in particular, is in treating produced and flowback water resulting from shale-gas or shale-oil extraction. The methods of this disclosure may play a major role in making the HDH technology to being cost effective for this application too.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for reducing thermodynamic irreversibilities in a combined heat and mass transfer device, the method comprising:
    directing a flow of a carrier-gas mixture through a fluid flow path in a combined heat and mass transfer device, the device operating at a pressure below atmospheric pressure;
    transferring heat and mass from or to the carrier-gas mixture by a direct or indirect interaction with a liquid composition that includes a vaporizable component in a liquid state to substantially change the content of the vaporizable component in the carrier-gas mixture via evaporation of the vaporizable component from the liquid composition or via condensation of the vaporizable component from the carrier-gas mixture, producing a flow of carrier-gas mixture having a concentration of the vaporizable component that differs from the concentration of the vaporizable component in the carrier-gas mixture before the heat and mass transfer process;
    varying the mass flow rate of at least one of (a) the carrier-gas mixture by extracting or injecting the carrier-gas mixture from at least one intermediate location in the fluid flow path in the combined heat and mass transfer device and (b) the liquid composition by extracting or injecting the liquid composition from at least one intermediate location in the fluid flow path in the heat and mass transfer device; and
    regulating the flow of the carrier-gas mixture or the liquid composition in the combined heat and mass transfer device to reduce the average local enthalpy pinch in the device.

2. The method of claim 1, wherein the minimum local enthalpy pinch in the device is less than about 27 kJ/kg dry air.

3. The method of claim 1, the flow of the carrier-gas mixture or the liquid composition is dynamically varied.

4. The method of claim 1, wherein the liquid composition is heated to a temperature not exceeding the precipitation temperature of scaling components in the liquid composition.

5. The method of claim 1, wherein the vaporizable component is water.

6. A method for reducing thermodynamic irreversibilities in a humidification-dehumidification system, the method comprising:
    directing a flow of a carrier-gas mixture comprising a vaporizable component and a carrier gas through a fluid-flow path in a packed bed humidifier, the system operating at a pressure below the atmospheric pressure;
    transferring heat and mass to the carrier-gas mixture by a direct interaction with a liquid composition comprising the vaporizable component in a liquid state as one of its components to substantially increase the content of the vaporizable component in the carrier-gas mixture via evaporation of vaporizable component from the liquid composition;
    directing the carrier-gas mixture from the humidifier to a dehumidifier, wherein heat and mass are transferred from the carrier-gas mixture by an indirect interaction with the liquid composition in a fluid-flow path in the dehumidifier, reducing the content of the vaporizable component in the carrier-gas mixture and preheating the liquid composition;
    varying the mass flow rate of at least one of (a) the carrier-gas mixture by extracting the carrier-gas mixture from at least one intermediate location in the fluid-flow path in the humidifier and injecting the extracted carrier-gas mixture at a corresponding location in the dehumidifier and (b) the liquid composition by extracting the liquid composition from at least one intermediate location in the fluid-flow path in the humidifier and injecting the liquid composition at a corresponding location in the dehumidifier; and
    regulating the flow of the carrier-gas mixture or of the liquid composition between the intermediate locations of the fluid flow paths in the humidifier and the dehumidifier to reduce the average local enthalpy pinch in the dehumidifier.

7. The method of claim 6, wherein the humidifier and the dehumidifier operate with a minimum enthalpy pinch less than about 27 kJ/kg dry air.

8. The method of claim 6, wherein the extractions and injections of the carrier-gas mixture or liquid composition occur along one or more discrete conduits extending between intermediate locations in the fluid-flow paths in the humidifier and in the dehumidifier.

9. The method of claim 6, wherein the extractions and injections of the carrier-gas mixture or the liquid composition between the fluid-flow paths in the humidifier and in the dehumidifier occur along intermediate locations extending continuously across a majority of the fluid-flow paths in the humidifier and in the dehumidifier.

10. The method of claim 6, wherein the humidifier and the dehumidifier are operated in a state of thermodynamic balancing that is closer to a state of constant local-humidity-ratio difference than to a state of constant stream-to-stream temperature difference.

11. The method of claim 6, wherein the rate of flow of carrier-gas mixture or liquid composition between intermediate locations is dynamically varied.

12. The method of claim 6, wherein the liquid composition is heated to a temperature not exceeding the precipitation temperature of scaling components in the liquid composition.

13. The method of claim 12, wherein the pressure of the humidifier and the dehumidifier is selected and established based on the vapor pressure of water at the temperature of the liquid composition.

14. The method of claim 13, wherein the liquid composition is heated to a temperature no greater than 65° C.

15. The method of claim 12, wherein the scaling components include at least one of calcium sulphate and magnesium sulphate.

16. The method of claim 12, wherein the scaling components include at least one of calcium carbonate and bicarbonate.

17. The method of claim 6, wherein the vaporizable component is water.

* * * * *